Mar. 6, 1923.

D. J. CAMPBELL

PNEUMATIC SAND HOPPER

Filed Mar. 21, 1921

INVENTOR
DONALD J. CAMPBELL
BY Frank E. Liverance Jr.
ATTORNEY.

INVENTOR
DONALD J. CAMPBELL
BY Frank E. Liverance, Jr. ATTORNEY.

Mar. 6, 1923.

D. J. CAMPBELL

PNEUMATIC SAND HOPPER

Filed Mar. 21, 1921

INVENTOR
DONALD J. CAMPBELL
BY *Frank E. Liverance, Jr.*
ATTORNEY

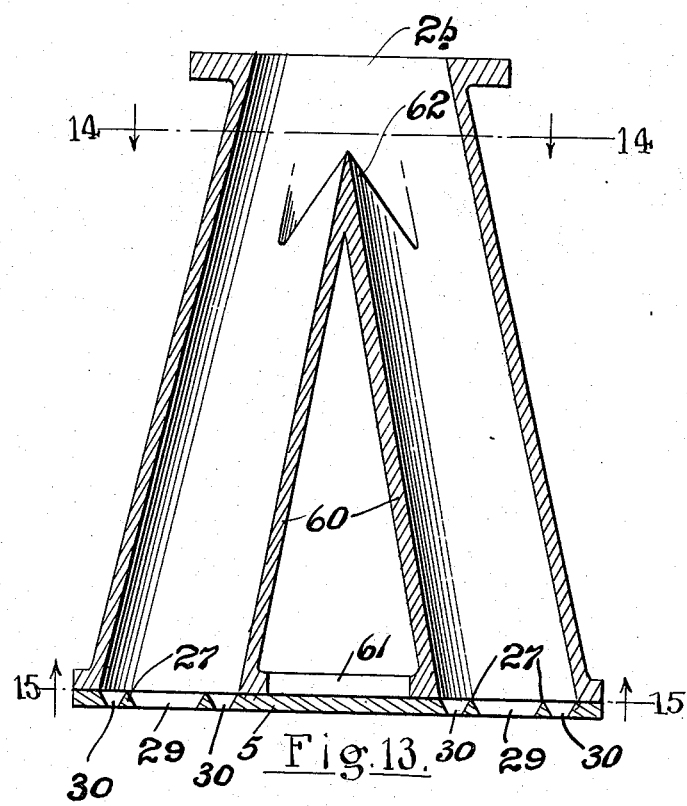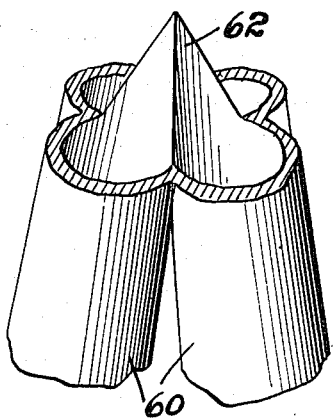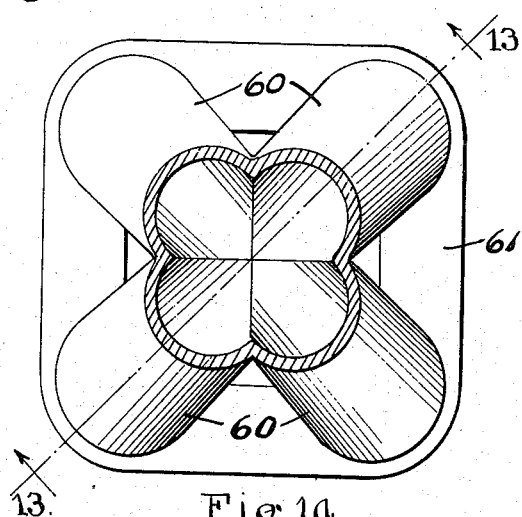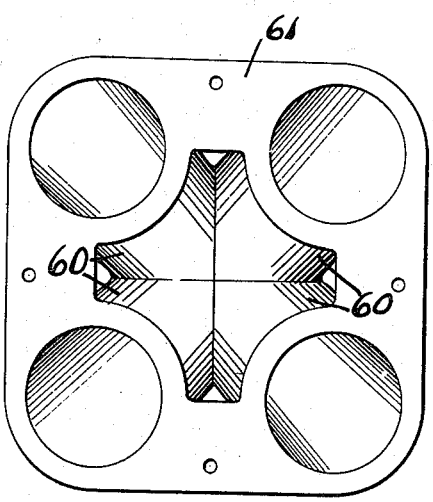

Patented Mar. 6, 1923.

1,447,376

UNITED STATES PATENT OFFICE.

DONALD J. CAMPBELL, OF MUSKEGON HEIGHTS, MICHIGAN, ASSIGNOR OF ONE-FOURTH TO ROBERT B. CAMPELL, OF SOUTH HAVEN, MICHIGAN.

PNEUMATIC SAND HOPPER.

Application filed March 21, 1921. Serial No. 454,193.

*To all whom it may concern:*

Be it known that I, DONALD J. CAMPBELL, a citizen of the United States of America, residing at Muskegon Heights, in the county of Muskegon and State of Michigan, have invented certain new and useful Improvements in Pneumatic Sand Hoppers; and I do hereby declare the following to be a full, clear, and exact description of the invention, such as will enable others skilled in the art to which it appertains to make and use the same.

This invention relates to a sand hopper adapted to be used particularly in conjunction with pneumatic sand ramming machines and designed for the effective handling of green sand and the ramming and compressing thereof with rapidity and to the proper density by the use of compressed air. Green sand, due to the binding material therein, is very hard to handle successfully through the application of compressed air at the upper side of a mass of the sand located within a container and which has outlet openings at the bottom, the sand at other places than directly above the openings being compressed into a very solid and dense mass which is extremely difficult to remove, while at the same time, the effectiveness of the force of the air is dissipated by its expansion through the mass of sand with a consequent lowering of the effective pressure thereof. It is a primary object and purpose of the present invention to make a sand hopper which obviates any difficulties of the nature above outlined, in which the sand in the hopper is all ejected from the same through compressed air propulsion without loss of force of the air, this taking place under substantially the full force of the air which is held from expansion and is confined against dissipation of its energy, thereby using the minimum amount of the air with a consequent saving in the cost of operation. These features, together with many others not specifically enumerated at this time, and the constructions for attaining the same will appear fully and in detail as understanding of the invention is had from the following description, taken in connection with the accompanying drawings, in which, Fig. 1 is a vertical section taken through the sand hopper of my invention, and showing its operative relation to the other adjacent portions of the machine with which it is used in practice.

Figure 7:
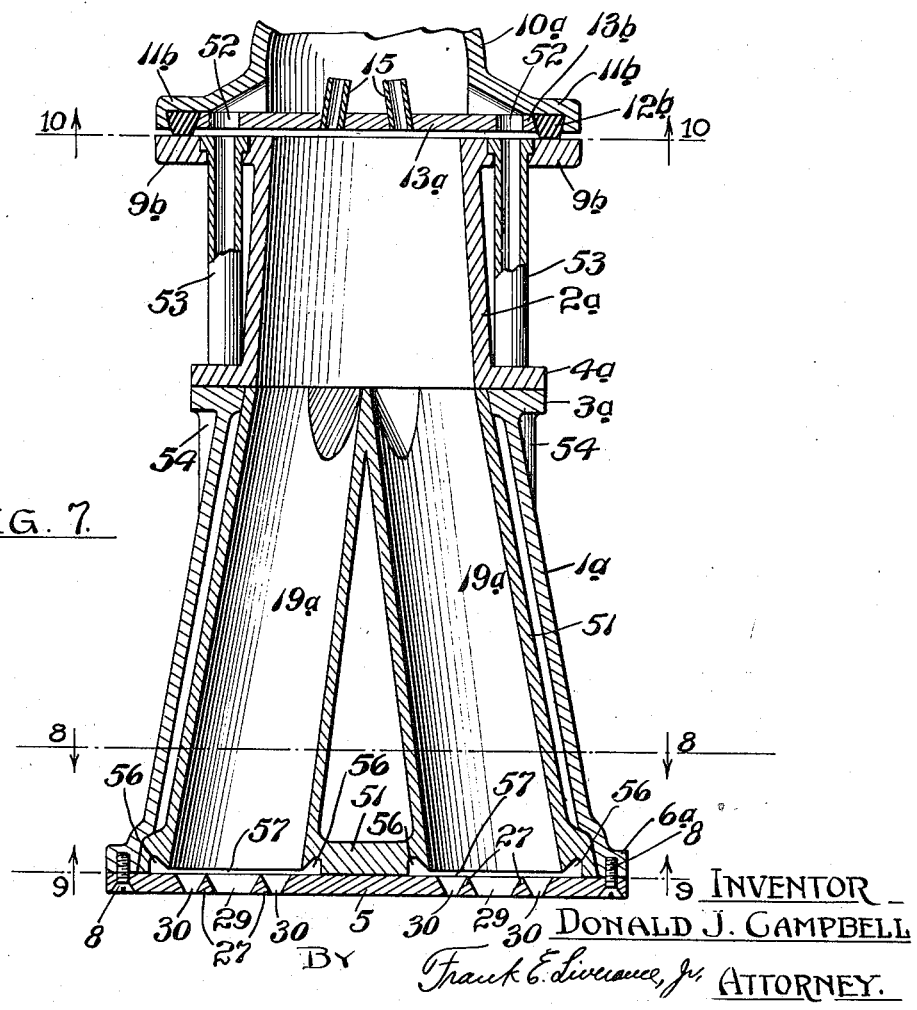
Fig. 7 is a vertical section therethrough, similar to the section of the hopper shown in Fig. 3.
Figure 8:
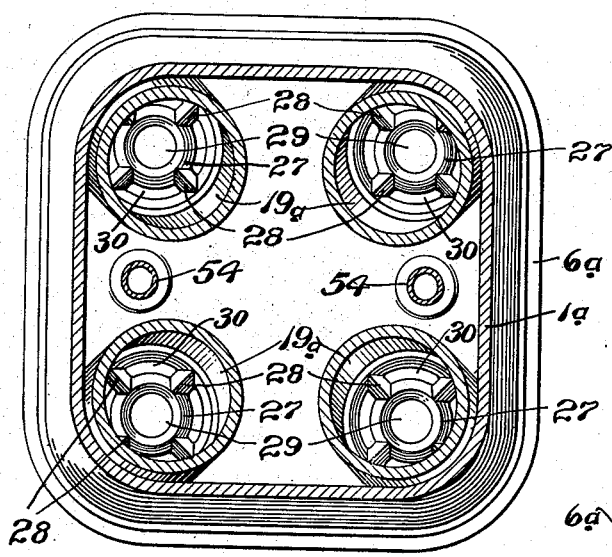
Figure 9:
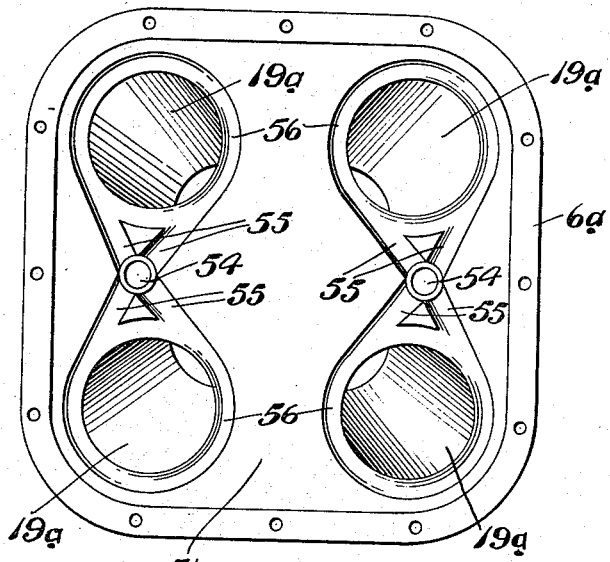
Figure 10:
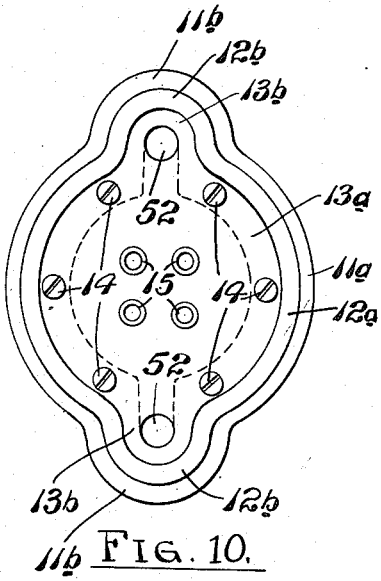

Figs. 8, 9 and 10 are sectional and under plan views taken, respectively, on the planes of lines 8—8, 9—9 and 10—10, of Fig. 7, and looking in the directions indicated by the arrows.

Figure 11:
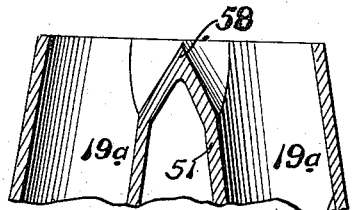

Fig. 11 is a fragmentary vertical section taken through the upper portion of the modified hopper at a different plane to show the construction at the upper ends of the passages therein.

Figure 12:
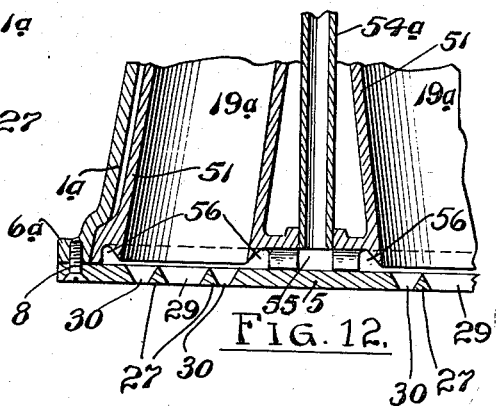

Fig. 12 is a fragmentary vertical section taken vertically through the lower part of the hopper in a plane at right angles to the section shown in Fig. 7.

Fig. 13 is a vertical sectional view taken substantially on the plane of line 13—13, of Fig. 14, and having reference to a still further modified form of structure.

Fig. 14 is a horizontal section and plan taken on the plane of line 14—14, of Fig. 13.

Fig. 15 is an under plan view of the hopper construction shown in Figs. 13 and 14 with the bottom plate removed, and Fig. 16 is a fragmentary perspective view of the upper end portion of the hopper, parts being broken away to show the interior structure.

Like reference characters refer to like parts in the different figures of the drawings.

In the construction of the hopper shown in Figs. 1 to 5 inclusive, two sections 1 and 2 are connected in superimposed relation, the first having an upper annular flange 3 and the other a lower annular flange 4 lying thereagainst for convenient securing of the same together by bolts or other like fastenings. The upper section 2 is open throughout from its upper to its lower end. The lower end of the lower hopper section 1 is covered by a plate 5 which is attached to the lower outwardly extending flange 6 of the section 1, suitable openings 7 being made through the plate adjacent its outer edges for the passage of securing screws 8 into said flange 6.

The upper end of the upper hopper section 2 is formed with an outwardly extending annular flange 9. In the operative position of the hopper the upper end thereof comes directly under a valve casing 10 formed at its lower end with a similar flange 11 in which a rubber gasket 12 is located and secured in place by a plate 13 which is attached to and covers the under side of the valve casing, securing screws 14 being used. A number of openings are made through the plate in each of which a short length of tubing 15 is secured, the same being positioned in direct alinement with a series of passages made in the lower section 1 of the hopper so that compressed air entered into the valve casing and going therefrom through tubes 15 into the hopper is directed by said tubes and aimed toward the upper ends of said passages and in alinement with the length of the passages.

Figure 1:
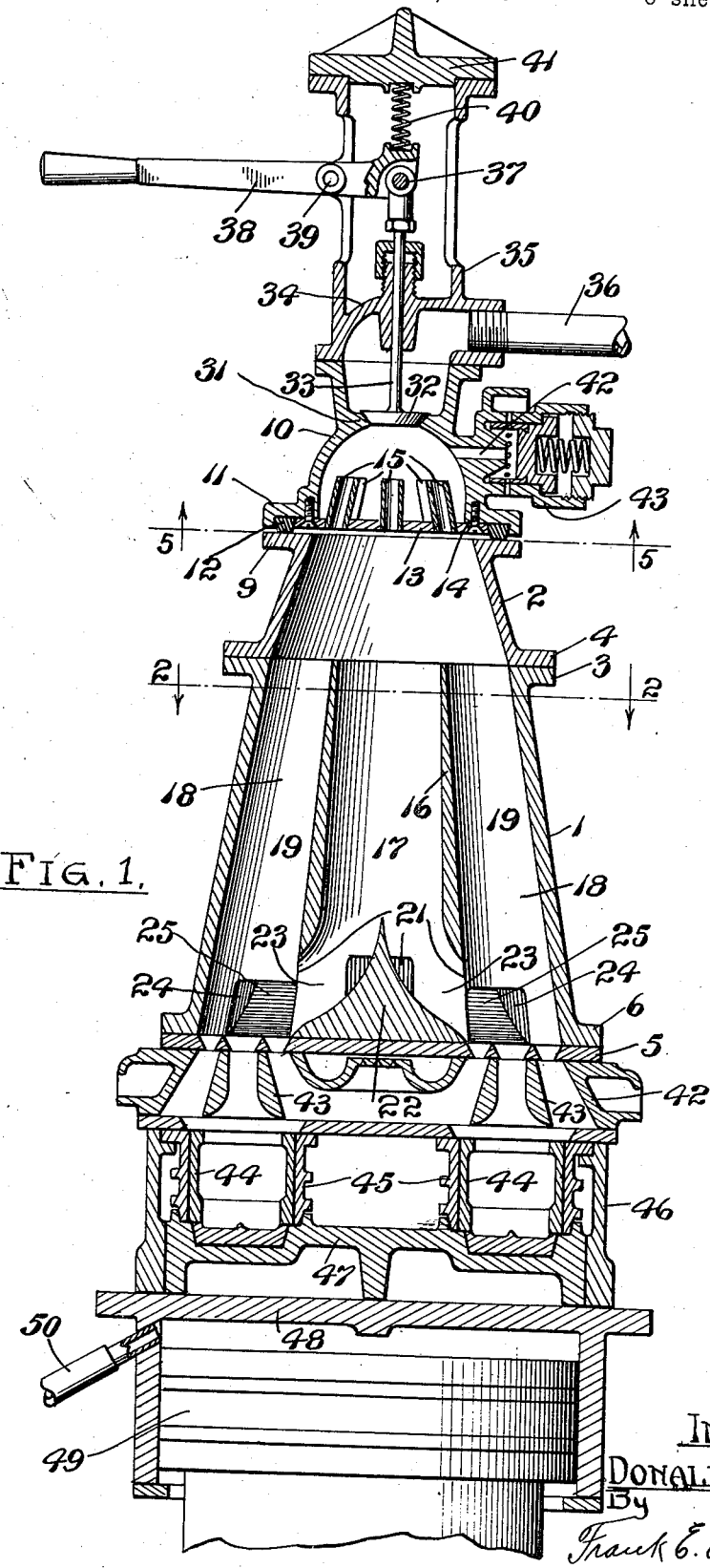
Figure 2:
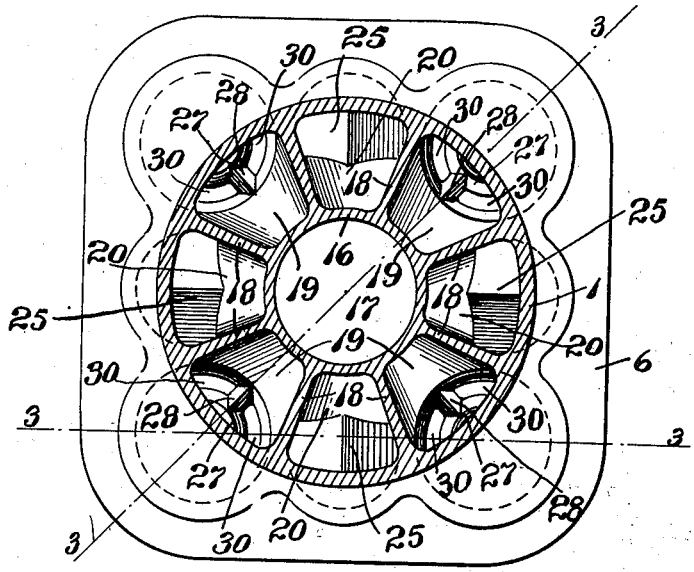
Fig. 2 is a horizontal section through the upper part of the hopper, on the plane of line 2—2, of Fig. 1.
Figure 3:
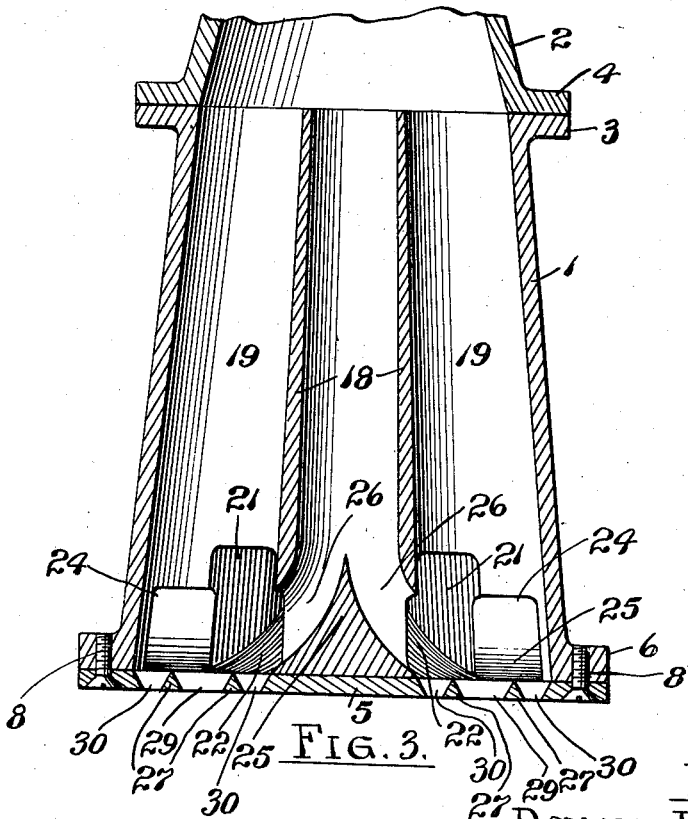
Fig. 3 is a vertical section through the hopper, substantially on the plane of line 3—3, of Fig. 2, the section shown in Fig. 1 being on the line 1—1, of Fig. 2.
Figure 4:
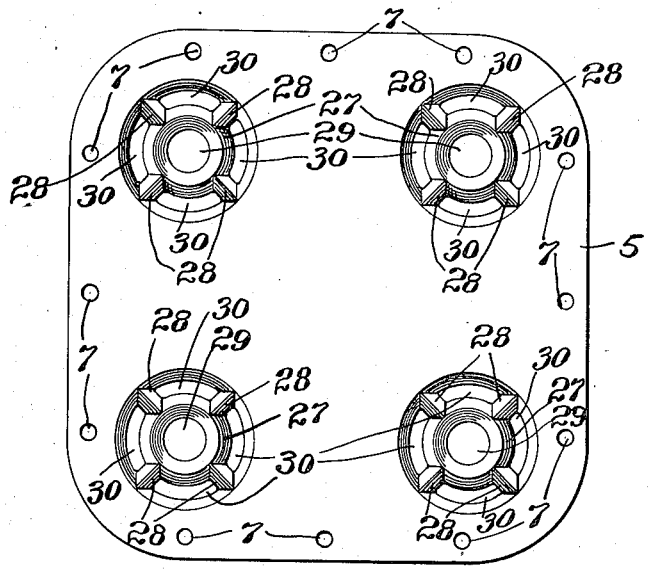
Fig. 4 is a plan of the lower closure plate to the hopper.
Figure 5:
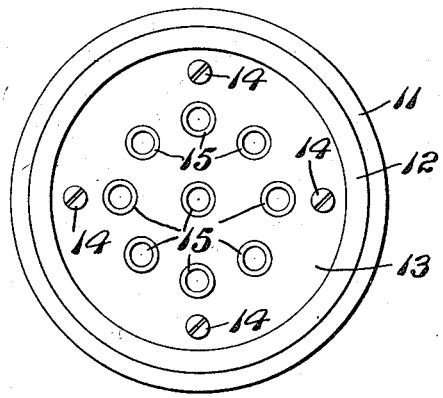
Fig. 5 is a view looking upward against the construction above the plane of line 5—5, of Fig. 1.
Figure 6:
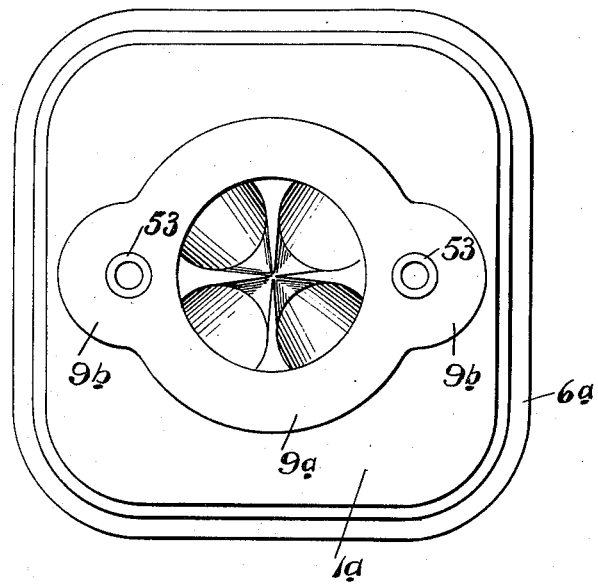
Fig. 6 is a plan of a modified construction of hopper.

The lower section 1 of the hopper is formed interiorly with a centrally located vertical substantially cylindrical tube 16 making a central vertical passage 17 through the lower section of the hopper. In practice, the passage enlarges somewhat toward the bottom and gradually. A plurality of radial partitions 18 connect the central tube 16 with the outer walls of the section 1, making alternate vertical passages 19 and 20 through the hopper which enlarge gradually toward the bottom. Openings 21 are made through the lower parts of the sides of tube 16 into each of the passages 19, and a deflecting member 22 is located in the lower end of the passage 17 immediately above the plate 5, this making curved passages 23 from the passage 17 into the lower ends of the four passages 19 as best shown in Fig. 1. Likewise openings 24 are made through the partitions 18 at their lower ends to make communication between the lower end of each passage 19 and its adjacent passages 20, and in the lower end of each passage 20, a deflector 25 having two curved sides is located, there being a smooth curved passage 26 from each passage 20 into each of its two adjacent passages 19, as best shown in Fig. 3.

The plate 5, at the lower end of each passage 19 has a circular opening therethrough in which a ring 27 of less diameter is positioned, being held in place by integral cross ties 28 connecting it to the plate. The ring has an opening 29 through it and the spaces between the outer sides of the rings and the adjacent edges of the plate are indicated at 30. The metal forming the ring 27 and the cross ties 28 tapers upwardly to a point, being triangular in cross section. This form of plate is not particularly essential to the working of the hopper, but is one that I have used in practice in the moulding of green sand cores for pistons.

The valve casing 10, heretofore described is formed with a horizontal cross partition having a valve seat opening therethrough in which a valve 32 is normally seated, closing the opening. Valve 32 is at the lower end of a vertical rod 33 which passes upwardly through a second cross partition 34 formed near the lower end of a sleeve member 35. A pipe 36 leads into the lower end of the member 35 below partition 34 for carrying compressed air into the space between the two partitions, and the adjacent walls of the valve casing 10 and sleeve member 35. Rod 33 at its upper end has pivotal connection with the inner end of a lever 38 as indicated at 37, said lever extending outwardly through a side of the sleeve member 35 and having pivotal mounting thereon between its ends 39. A spring 40 is disposed between the upper side of the inner end of the lever 38 and an overhead beam 41 from which the sleeve member 35 is suspended. The spring normally keeps the valve 32 in closed position, though it is evident that on a downward pull on the outer end of the lever 38, said valve may be lifted for the passage of the air through tubes 15 into the hopper, the lever being in effect a handle for manual raising of the valve whenever desired.

The hopper in practice is mounted for movements so as to come under the lower end of the valve casing 10, or be moved away therefrom for the reception of sand therein, all of which appears in my application for patent on moulding machine, Serial Number 443,739, filed Feb. 10, 1921, in which this hopper is shown as an element of the general construction. When in operative position, as shown in Fig. 1, the plate 5 comes directly over a sand guide and directing plate 42 having sand guide members 43 as a part of its construction, the same being located above and connected to a mould or core box in which a number of core forms 44 are included, located within master boxes 45, the whole being enclosed within an outer casing 46, the core box also having a base plate 47. The specific construction of this mould or core box is not any feature of the present invention, being fully described and claimed in a copending application for patent thereon Serial Number 443,738, filed Feb 10, 1921. But, irrespective of the specific construction of the core box or the sand guide and directing plate therefor, also specifically described and claimed in a separate application for patent Serial Number 454,192, filed March 21, 1921, the openings in the plate 5 at the lower ends of passages 19 come into conjunction with openings and passages through the plate 42 so that the sand forced from the hopper passes directly into the mould or core forms in the core box. The mould or core box is located on a table 48 mounted for vertical movements with respect to a supporting piston head 49, the vertical movement of the table being effected by compressed air entered between the table and head 49 through inlet 50, as fully described in the application on moulding machine, above noted. This clamps the hopper and the mould or core box and cover plate therefor between the gasket 12 and the table 48 and insures against the escape of pressure around the upper end of the hopper, as is evident.

In the operation, with the parts as shown in Fig. 1, the hopper being wholly or partly filled with green sand, it is necessary merely to pull down on the lever 38 to permit the air to pass by the valve 32. Immediately, the air rushes past the valve and into the lower portion of the valve casing 10, passing therefrom through tubes 15 into the upper section 2 of the hopper. The tubes 15 direct the air to the various vertical passages 17, 19 and 20 and give direct impacting impulse to the sand therein and above the upper ends of the same, if any is present in the upper section 2, causing the same to be forced downwardly. That in the passages 19 is forced through the openings in plate 5 through the plate 42 and into the mould forms ready to receive it. And at the same time the sand in central passage 17 and the intermediate passages 20 between passages 19 is forced downwardly and directed laterally into said passages 19 at the lower end thereof, keeping the same filled and at proper density at all times, so that the sand when finally delivered into the core box forms is properly rammed and of equal density throughout.

This construction of sand hopper utilizes the impacting force of the air to its maximum, and there are no dead spots where the sand can collect and become packed in the hopper so as to clog the same, nor is there any chance for the force of the air to be lost through lateral expansion through the sand. The passages having rigid walls, the sand must pass downwardly ahead of the air and be forced therefrom at the lower openings in plate 5, and all of the force of the air on the entire upper area of the sand is made effective for the delivery of the sand from the four points of ejectment thereof. Of course, this number may be varied with different types of work to be done and with different specific constructions of hoppers for different numbers of delivery openings. But in all cases, the air force is utilized to its maximum extent.

Various modifications in the structure of the hopper may be made without departing from the invention. In Figs. 6 to 10 inclusive I have shown one modified form in which the lower section of the hopper has an outer shell $1^a$ within which a sand passage auxiliary shell 51 is located, the same being in the form of an integral casting having four downwardly and outwardly extending tubes making sand passages $19^a$ as shown, the upper ends of which come together. The valve casing $10^a$ is slightly modified in that the flange $11^a$ thereof has two oppositely projecting ears $11^b$ and the gasket $12^a$ is modified to correspond, having portions $12^b$ conforming to said ears. Likewise the plate $13^a$ has similar projecting ears $13^b$ which have openings 52 therethrough. The upper flange $9^a$ of the upper section $2^a$ of the hopper has like ears $9^b$ and vertical tubes 53 are connected at their upper ends to said ears $9^b$, and pass therethrough, the openings in said tubes coming directly under the openings 52. These tubes extend downwardly and through lower flange $4^a$ and are in conjunction with other tubes 54 of like capacity cast integral with the hopper section $1^a$ and joining at their upper ends with the upper flange $3^a$ thereof while at their lower ends the same pass through the base of the inner shell 51, being located one between the lower ends of a pair of passages $19^a$, as shown in Fig. 9. The base of said inner shell has grooves 55 leading to curved grooves 56 made around the lower ends of the tubular passage ways $19^a$, there being a relatively narrow passage from said grooves 56 into the lower ends of the passages $19^a$, as indicated at 57, so that the air pressure will be uniformly distributed around the lower ends of the passages, the entire area of the passage at 57 being no greater than that of the cross section of the air passage in tubes 53 and 54 for each pair of tubes having passages $19^a$. The lower end of the shell $1^a$ is slightly modified for the reception of the lower end of the inner shell, flange $6^a$ being of slightly different form as best shown in Fig. 7.

When the air is let into the valve casing with this construction of hopper, the sand is forced through passages $19^a$ as before, and at the same time, air passes through openings 52, and tubes 53 and 54 and passages 55 to the grooves 56, thereupon exerting its force on the sand as it passes from the hopper to the core or mould box designed to receive it. This aids in ramming the sand and compensates for any loss of force due to the expansion of the air above the sand to fill the interstices in such sand in the passages $19^a$ and applies the full force of the pressure direct to the sand closely adjacent the cores or moulds formed and insures uniformity of density in the cores or moulds made. The practical result is the equivalent in every way of that previously described with reference to the first structure of hopper. It will be noted that without change in the circular form of the passages 19ª at the upper ends thereof where they meet, a flat ledge or table would be left on which sand might accumulate. In practice, it is desirable to cut away portions of the inner shell casting so as to practically eliminate the ledge, a tapered pointed center, as indicated at 58 being located at the upper inner adjacent sides of said passages, whereby the sand cannot find place to stop when entered into the hopper and forced therefrom by air pressure.

In Figs 13 to 16 inclusive, I have shown my invention in practically its simplest form. The sand passages are made by a plurality of downwardly diverging tubes 60 which come together at their upper ends, the lower ends of the passages through the tubes coming directly over the outlet openings through the lower closure plate 5. The construction is made as an integral casting and the tubes 60 are joined at their lower ends by an integrally cast frame 61 to which the plate 5 is connected. At their upper inner joining sides, the same are extended so that a substantially pyramidal extension 62 is made coming to a point and the sides of which aline with the inner sides of the tube passages.

The sand passes into the upper chamber 2ᵇ and therefrom under air pressure to the passages through tubes 60, being forced therefrom through passages 29 and 30. No waste space is present, and there is no loss of the force of the compressed air through expansion of the same into waste spaces. This construction is very practical in the case of smaller hoppers where large volumes of sand are not handled, and the distances which the sand has to travel through the passages therefor is not great, the additional means shown in the other hopper structures not being needed. While I have shown the hopper in this modification with four tubes, it is apparent that the number may be varied for different classes of work needing either more or less than the four passages for sand, and this without in any measure departing from the invention.

The constructions of sand hopper described are very effective in the use of compressed air, making it possible to use moulding sand with the same facility as core or other forms of sand and with especial economy in the use of air irrespective of the kind of sand used. The air is confined to the necessary spaces through which it must work, there being no possibility of lateral expansion through a body of sand as is the case where the hopper is an open hollow shell. This is a very practical feature as compressed air used in quantity is a source of heavy expense. While I have shown several modifications, it is clear that various other modifications will occur to others skilled in the art without departing from the invention defined in the appended claims, and I, accordingly, consider myself entitled to all such modifications and varieties in construction form as come within the scope of such claims.

I claim:

1. In combination, a vertically positioned hopper comprising a lower relatively longer section and an upper relatively shorter section connected thereto, said upper section being open throughout from its upper to its lower end, and said lower section having a plurality of substantially vertical sand passages therein opening at their upper ends into the interior of the upper section, and a closure for the lower end of the lower section provided with openings directly under the lower ends of said sand passages, substantially as described.

2. In combination, a vertically positioned sand receiving hopper provided with a plurality of substantially vertical and spaced apart sand passages therethrough, and with auxiliary sand passages lying alongside of said first sand passages and leading thereinto at the lower ends thereof, and a closure for the lower end of the hopper having openings therethrough directly under the lower ends of said first passages, substantially as described.

3. In a device of the class described, a vertically positioned hopper having outer walls, an inner substantially cylindrical smaller wall within the outer walls, and partitions connecting said walls, whereby a plurality of substantially vertical passages are made through the hopper, a closure to the lower end of the hopper having openings therethrough directly under alternate passages located between the said inner and outer walls of the hopper, said partitions having openings therethrough adjacent the lower ends of the passages, and said inner wall having openings through its sides at its lower end for communication between the passages having outlets at their lower ends, and the passages not having said outlets, substantially as described.

4. A sand receiving hopper comprising an outer wall and substantially vertical division partititons within whereby the hopper is provided with a plurality of vertical passages therethrough, said partitions at their lower ends having openings to provide communication between the passages at their lower ends, a closure for the lower end of the hopper having openings therethrough directly under the lower ends of certain of the sand passages, and means for directing sand from the other of said passages into the passages provided with outlets at their lower ends, substantially as described.

5. In combination, a sand hopper having a plurality of restricted vertical passages therethrough for the passage of sand, a closure to the lower end of the hopper having openings therein directly under the lower ends of said passages to serve as outlets thereto, means for applying pneumatic pressure to the sand at the upper ends of said passages, and means for also transmitting auxiliary pressure to the sand in said passages adjacent the points of outlet thereof, substantially as described.

6. In combination, a hopper casing divided by partitions to make a central substantially vertical passage, and an even number of passages around the central passage, a closure to the lower end of the casing having openings therein directly under alternate passages of said outer passages, said partitions immediately above the closure having openings therethrough whereby said central passage communicated with each of the passages having lower outlets, and said outer passages not provided with lower outlets communicate each with the two adjacent passages which are provided with lower outlets, and a deflecting member located in the lower end of the central passage, and also in the lower end of each of said outer passages unprovided with outlets, substantially as and for the purposes described.

7. The elements in combination defined in claim 6 combined with means for directing pneumatic pressure against sand in said passages, separately into the upper end of each passage, substantially as described.

In testimony whereof I affix my signature.

DONALD J. CAMPBELL.